United States Patent
Perry et al.

(10) Patent No.: US 8,269,776 B2
(45) Date of Patent: Sep. 18, 2012

(54) METHOD FOR GENERATING A DISTANCE FIELD OF AN OBJECT REPRESENTED BY STYLIZED STROKES

(75) Inventors: Ronald N. Perry, Cambridge, MA (US);
Sarah F. Frisken, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 841 days.

(21) Appl. No.: 12/414,730

(22) Filed: Mar. 31, 2009

(65) Prior Publication Data

US 2010/0245359 A1    Sep. 30, 2010

(51) Int. Cl.
*G06T 11/00*    (2006.01)
*G09G 5/00*    (2006.01)
*G09G 5/26*    (2006.01)
*G06K 9/48*    (2006.01)

(52) U.S. Cl. ........ 345/467; 345/468; 345/470; 345/472; 345/611; 345/613; 382/199

(58) Field of Classification Search .......... 345/611, 345/466–469, 440–442, 419–427, 619, 629, 345/581–589, 474; 382/199
See application file for complete search history.

(56) References Cited

U.S. PATENT DOCUMENTS

| | | | |
|---|---|---|---|
| 6,396,492 B1 | 5/2002 | Frisken et al. | |
| 6,917,369 B2 | 7/2005 | Perry et al. | |
| 6,933,952 B2 * | 8/2005 | Frisken et al. | 345/611 |
| 6,982,724 B2 * | 1/2006 | Frisken et al. | 345/611 |
| 7,002,598 B2 * | 2/2006 | Frisken et al. | 345/611 |
| 7,006,095 B2 * | 2/2006 | Frisken et al. | 345/469 |
| 7,006,108 B2 * | 2/2006 | Perry et al. | 345/611 |
| 7,030,881 B2 * | 4/2006 | Perry et al. | 345/441 |
| 7,034,830 B2 * | 4/2006 | Perry et al. | 345/441 |
| 7,034,845 B2 | 4/2006 | Perry et al. | |
| 7,042,458 B2 * | 5/2006 | Frisken et al. | 345/469 |

(Continued)

OTHER PUBLICATIONS

P.-T. Bremer, S. Porumbescu, F. Kuester, B. Hamann, K. I. Joy and K.-L. Ma. Virtual clay modeling using adaptive distance fields. In Proceedings of the 2002 International Conference on Imaging Science, Systems, and Technology (CISST 2002), pp. 1-6, Jun. 24-27, 2002.*

(Continued)

*Primary Examiner* — Jin-Cheng Wang
(74) *Attorney, Agent, or Firm* — Dirk Brinkman; Gene Vinokur

(57) ABSTRACT

A method generates a distance field of an object, where the distance field includes a set of cells and the object includes a set of stylized strokes. Each stylized stroke includes a centerline, a set of profiles, and a set of terminals. A processor is included for performing steps of the method. A first cell of the set of cells enclosing the object is determined. An outside reconstruction method is associated with the first cell. For each stylized stroke, centerline cells of the set of cells are determined, where each centerline cell encloses a portion of the centerline of the stylized stroke. A centerline reconstruction method is associated with each centerline cell. For each terminal of each stylized stroke a terminal distance field is generated, the terminal distance field including a terminal reconstruction method. Reconstructed distances are determined using the reconstruction methods to generate the distance field of the object.

4 Claims, 2 Drawing Sheets

U.S. PATENT DOCUMENTS

| | | | |
|---|---|---|---|
| 7,106,332 B2 * | 9/2006 | Perry et al. | 345/467 |
| 7,123,271 B2 | 10/2006 | Perry et al. | |
| 7,190,369 B2 * | 3/2007 | Fernandez et al. | 345/581 |
| 7,190,926 B2 * | 3/2007 | Ebe | 399/286 |
| 2004/0189618 A1 * | 9/2004 | Perry et al. | 345/179 |
| 2004/0189638 A1 * | 9/2004 | Frisken et al. | 345/441 |
| 2004/0189639 A1 * | 9/2004 | Perry et al. | 345/441 |
| 2004/0189642 A1 * | 9/2004 | Frisken et al. | 345/443 |
| 2004/0189643 A1 * | 9/2004 | Frisken et al. | 345/467 |
| 2004/0189644 A1 * | 9/2004 | Frisken et al. | 345/473 |
| 2004/0189653 A1 * | 9/2004 | Perry et al. | 345/557 |
| 2004/0189655 A1 * | 9/2004 | Perry et al. | 345/582 |
| 2004/0189661 A1 * | 9/2004 | Perry et al. | 345/611 |
| 2004/0189662 A1 * | 9/2004 | Frisken et al. | 345/611 |
| 2004/0189663 A1 * | 9/2004 | Perry et al. | 345/611 |
| 2004/0189664 A1 * | 9/2004 | Frisken et al. | 345/611 |
| 2004/0189665 A1 * | 9/2004 | Perry et al. | 345/611 |
| 2004/0189666 A1 * | 9/2004 | Frisken et al. | 345/611 |
| 2004/0193389 A1 * | 9/2004 | Perry et al. | 703/2 |
| 2009/0027398 A1 * | 1/2009 | Frisken | 345/442 |

OTHER PUBLICATIONS

M. W. Jones, J. A. Baerentzen, and M. Sramek. 3D Distance Fields: A Survey of Techniques and Applications. IEEE Transactions on Visualization and Computer Graphics, 12(4):581-599, Jul./Aug. 2006.*

S. Yamazaki, K. Kase, and K. Ikeuchi. Hardware-accelerated visualization of volume-sampled distance fields. In SMI '03: Proceedings of the Shape Modeling International 2003, Washington, DC, USA, 2003. IEEE Computer Society, pp. 264-271, May 21, 2003.*

J. Pope, S. F. Frisken, R. N. Perry, "Dynamic Meshing Using Adaptively Sampled Distance Fields", Mitsubishi Electric Research Laboratory (MERL) Technical Report 2001-TR2001-13, pp. 1-4, Mar. 27, 2001.*

Frisken S. F. et al. "Adaptively Sampled Distance Fields: A General Representation of Shape for Computer Graphics" Computer Proceeding. New Orleans, LA, Jul. 23-28, 2000; [Computer Graphics Proceedings. SIGGRAPH], New York, NY: 249-254.

Elena J. Jakubiak et al., "An Improved Representation for Stroke-Based Fonts" SIGGRAPH 2006 Conference Abstrats and Applications.

* cited by examiner

METHOD FOR GENERATING A DISTANCE FIELD OF AN OBJECT REPRESENTED BY STYLIZED STROKES

RELATED PATENT APPLICATION

The following Patent Application is related, co-filed, and incorporated herein: U.S. Non-Provisional patent application Ser. No. 12/414,730, "A Method for Generating a Distance Field of an Object Represented by Outlines:" filed by Perry et al. on Mar. 31, 2009.

FIELD OF INVENTION

The invention relates generally to generating distance fields, and more particularly to generating distance fields of objects represented by stylized strokes.

BACKGROUND OF THE INVENTION

In the field of computer graphics, the rendering of two-dimensional objects is of fundamental importance. Two-dimensional objects, such as character shapes, corporate logos, and elements of an illustration contained in a document, are rendered as static images or as a sequence of frames comprising an animation. There are numerous representations for two-dimensional objects and it is often the case that one representation is better than another representation for specific operations such as rendering and editing. In these cases, a conversion from one form to another is performed.

Distance fields have proven to be an effective representation for rendering and editing two-dimensional shapes, as demonstrated by the following patents, all incorporated herein by reference: U.S. Pat. No. 6,396,492, issued May 28, 2002, entitled "Detail-directed hierarchical distance fields;" U.S. Pat. No. 7,034,845, issued Mar. 13, 2007, entitled "Antialiasing an Object Represented as a Two-Dimensional Distance Field in Image-Order;" U.S. Pat. No. 7,123,271, issued Oct. 17, 2006, entitled "Antialiasing a Set of Objects Represented as a Set of 2D Distance Fields in Image-Order;" and U.S. Pat. No. 6,917,369, issued Jul. 12, 2005, entitled "Method and Apparatus for Rendering Cell-based Distance Fields using Texture Mapping."

Although we focus here on digital type, possibly the most common and important two-dimensional object, the following discussion applies to all types of two-dimensional objects.

We begin with some basic background on digital type. A typical Latin font family, such as Times New Roman or Arial, includes a set of fonts, e.g., regular, italic, bold, and bold italic. Each font includes a set of individual character shapes called glyphs. Each glyph is distinguished by its various design features, such as underlying geometry, stroke thickness, serifs, joinery, placement and number of contours, and ratio of thin-to-thick strokes.

There are a number of ways to represent fonts, including outlines, uniform width strokes, and stylized strokes.

Outline-based representations have been adopted and popularized by Bitstream Inc. of Cambridge, Mass., Adobe Systems, Inc. of Mountain View, Calif., Apple Computer, Inc., of Cupertino, Calif., Microsoft Corporation of Bellevue, Wash., URW of Hamburg, Germany, and Agfa Compugraphic of Wilmington, Mass.

To optimize memory usage, uniform width stroke fonts can be used. These fonts typically group sets of uniform width strokes, a.k.a. radicals or graphemes, which are commonly repeated in Chinese characters throughout a font, as a single simple shape that is then reused across characters.

Stylized Stroke Fonts (SSFs) are enhanced stroke-based fonts whose strokes have variable thickness and stylistic stroke ends, see "An Improved Representation for Stroke-based Fonts", SIGGRAPH 2006 Conference Abstracts and Applications, Elena J. Jakubiak, Ronald N. Perry, and Sarah F. Frisken.

SSFs are also described in U.S. Non-Provisional patent application Ser. No. 12/12/359,819 "Method for Converting Outline Characters to Stylized Stroke Characters," filed by Jakubiak et al. on Jan. 26, 2009, incorporated herein by reference.

SSFs employ a modular structure that leverages the repetition of shape within a font, enabling SSFs to match the expressiveness of outline fonts with a memory footprint comparable to current uniform width stroke fonts.

To enable the use of distance-based rendering, see, for example, U.S. Pat. No. 6,917,369 "Method and Apparatus for Rendering Cell-based Distance Fields using Texture Mapping," incorporated herein by reference, as well as other operations such as editing, space and time efficient methods are required for generating a distance field of an object, such as a glyph, represented by various forms.

It is an object of the invention to provide a space and time efficient method for generating a distance field of an object represented by stylized strokes.

SUMMARY OF THE INVENTION

A method generates a distance field of an object, where the distance field includes a set of cells and the object includes a set of stylized strokes. Each stylized stroke includes a centerline, a set of profiles, and a set of terminals. A processor is included for performing steps of the method.

A first cell of the set of cells enclosing the object is determined. A distance value for a point outside the object is specified, where the distance value for the point outside the object is negative. An outside reconstruction method is associated with the first cell, where the outside reconstruction method evaluates, for each point inside the first cell, to the specified distance value for the point outside the object.

For each stylized stroke, centerline cells of the set of cells are determined, where each centerline cell encloses a portion of the centerline of the stylized stroke. A centerline reconstruction method is associated with each centerline cell, where the centerline reconstruction method evaluates a distance for each point within the centerline cell and the evaluation for a particular point within the centerline cell locates a closest point on the centerline that is nearest to the particular point, determines an offset distance from the closest point to the particular point, determines, for each profile in the set of profiles corresponding to the stylized stroke, a profile distance at the closest point, and subtracts the offset distance from a function of the profile distances to evaluate the distance for the particular point within the centerline cell.

For each terminal of each stylized stroke a terminal distance field is generated, where the terminal distance field includes a terminal reconstruction method. For each point in the first cell, a reconstructed distance of the first cell using the outside reconstruction method is determined, reconstructed distances of the centerline cells using the centerline reconstruction methods are determined, and reconstructed distances of the terminal distance fields using the terminal reconstruction methods are determined.

For each point in the first cell, the reconstructed distance of the first cell, the reconstructed distances of the centerline cells, and the reconstructed distances of the terminal distance fields are combined to generate the distance field of the object.

DETAILED DESCRIPTION OF THE PREFERRED EMBODIMENT

Figure 1:
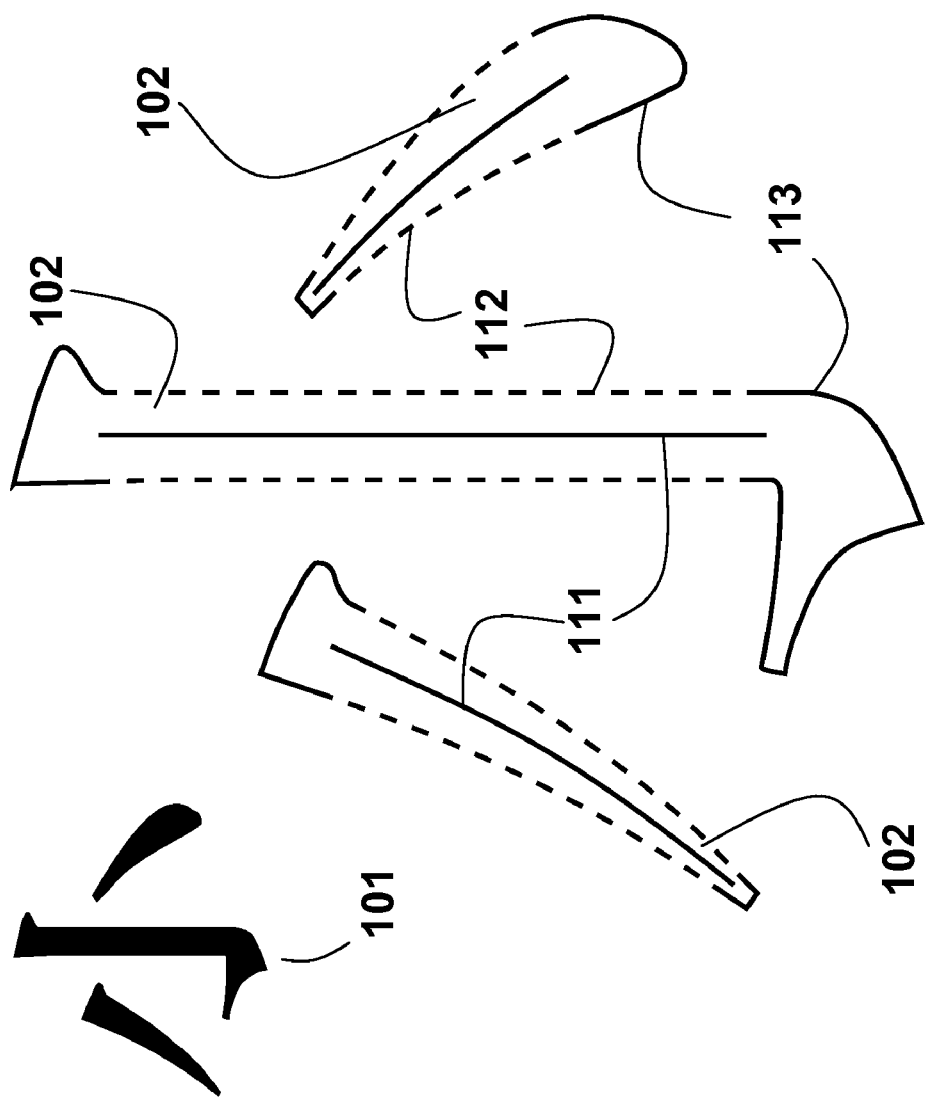
FIG. 1 is a diagram of an object, described by a set of stylized strokes comprising the object, whose distance field is generated and rendered according to embodiments of the invention.

FIG. 1 shows an object 101, described by a set of stylized strokes 102 comprising the object, whose distance field is generated and rendered according to embodiments of the invention.

Figure 2:
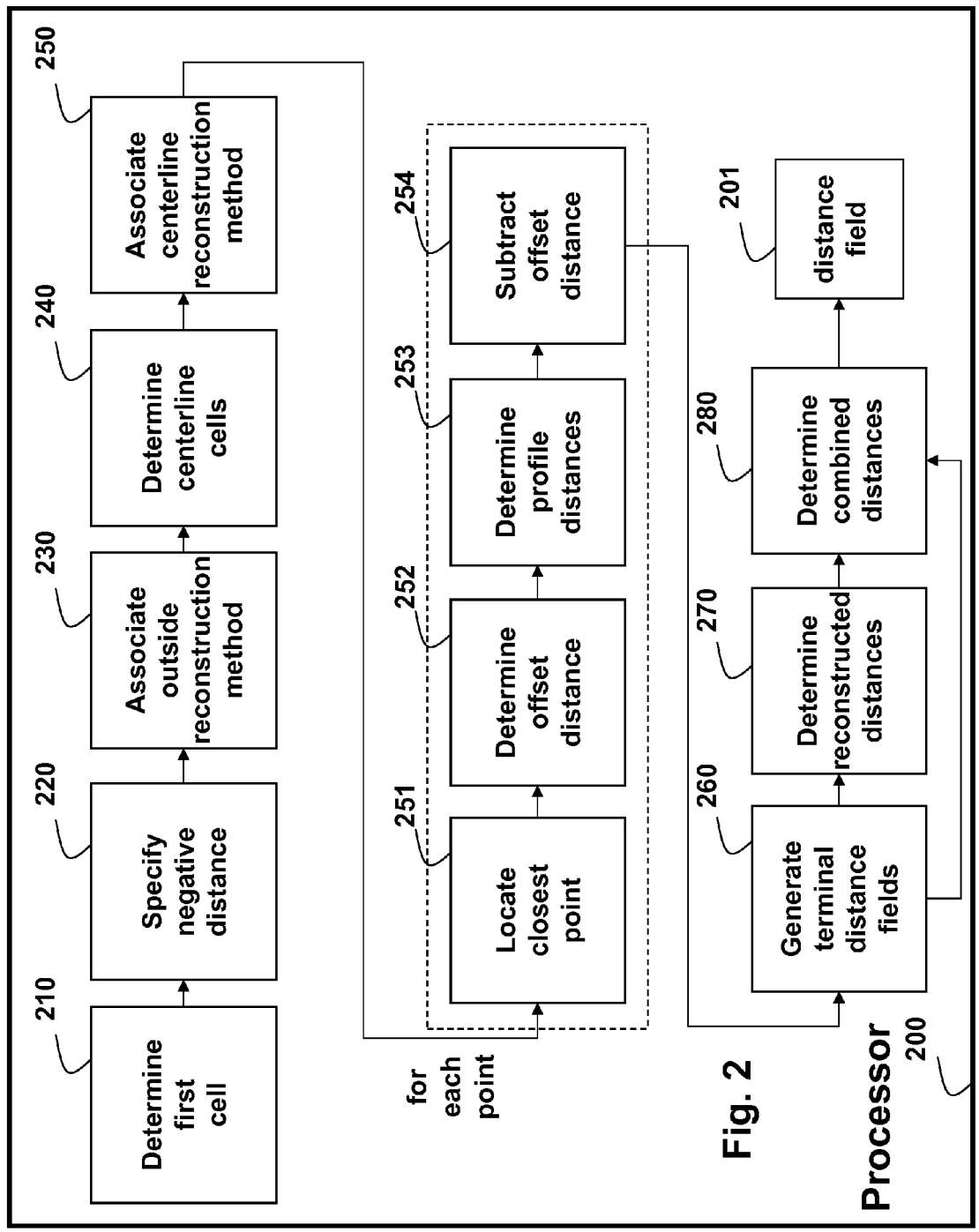
FIG. 2 is a flow diagram of a method for generating the distance field of the object of FIG. 1 according to embodiments of the invention.

FIG. 2 shows a method for generating a distance field 201 of the object 101 according to embodiments of the invention. The method can be performed by a processor 200.

The method generates the distance field 201 of the object 101 from the set of stylized strokes 102. The distance field includes a set of cells, and the object includes the set of stylized strokes 102.

As shown in FIG. 1, each stylized stroke includes a centerline 111, a set of profiles 112, and a set of terminals 113.

A first cell of the set of cells enclosing the object 101 is determined 210. A distance value for a point outside the object 101 is specified 220. The distance value for the point outside the object 101 is negative. An outside reconstruction method is associated 230 with the first cell. The outside reconstruction method evaluates, for each point inside the first cell, to the specified distance value for the point outside the object 101.

For each stylized stroke, centerline cells of the set of cells are determined 240. Each centerline cell encloses a portion of the centerline of the stylized stroke. A centerline reconstruction method is associated 250 with each centerline cell. The centerline reconstruction method evaluates a distance for each point within the centerline cell. The evaluation includes the following steps for a particular point within the centerline cell:

A closest point on the centerline that is nearest to the particular point is located 251. An offset distance from the closest point to the particular point is determined 252. For each profile in the set of profiles corresponding to the stylized stroke, a profile distance at the closest point is determined 253, and the offset distance is subtracted 254 from a function of the profile distances to evaluate the distance for the particular point within the centerline cell.

Various methods can be used to define the function of the profile distances. For example, the function can first determine a side of the centerline on which the particular point lies and then can select a particular profile distance corresponding to a particular profile associated with the side of the centerline.

For each terminal of each stylized stroke, a terminal distance field is generated 260. The terminal distance field includes a terminal reconstruction method.

For each point in the first cell, a reconstructed distance of the first cell is determined 270 using the outside reconstruction method, reconstructed distances of the centerline cells are determined 270 using the centerline reconstruction methods, and reconstructed distances of the terminal distance fields are determined 270 using the terminal reconstruction methods.

Then, for each point in the first cell, the reconstructed distance of the first cell, the reconstructed distances of the centerline cells, and the reconstructed distances of the terminal distance fields are combined 280 to generate the distance field 201 of the object 101.

Once the distance field 201 of the object 101 is generated, the distance field 201 can be rendered to a display device for viewing the object 101. The distance field 201 can be rendered using various prior art methods such as U.S. Pat. No. 6,917,369 "Method and Apparatus for Rendering Cell-based Distance Fields using Texture Mapping."

It should be noted that a different sign convention can be used to distinguish between points inside and points outside the object 101. For example, the specified distance value for the point outside the object 101 can be positive rather than negative as described above.

Operating Environment

The invention is operational with numerous general purpose or special purpose computing system environments or configurations. Examples of well known computing systems, environments, and/or configurations that are suitable for use with the invention include, but are not limited to, personal computers, server computers, handheld or laptop devices, multiprocessor or multi-core systems, graphics processing units (GPUs), application-specific integrated circuits (ASICs), field programmable gate arrays (FPGAs), microcontroller-based systems, set top boxes, programmable consumer electronics, network PCs, minicomputers, mainframe computers, distributed computing environments that include any of the above systems or devices, and the like, i.e., generally processors. A monitor or other type of display device is connected to any of the above systems to enable the rendering of the distance field 201 of the object 101 generated according to embodiments of the invention.

As can be seen above, there are numerous opportunities for operating the invention in parallel. For example, the outside reconstruction method, the centerline reconstruction methods, and the terminal reconstruction methods contain no dependencies between each other and therefore can exploit hardware and multi-core implementations of the invention to improve performance of the generation of the distance field 201 of the object 101. As another example, the determination of the reconstructed distances for a particular centerline cell contains no inter-dependencies, thereby allowing the reconstructed distances to be determined for the particular centerline cell in parallel.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for generating a distance field of an object, the distance field including a set of cells, the object including a set of stylized strokes, each stylized stroke including a centerline, a set of profiles, and a set of terminals, comprising the steps of:

determining a first cell of the set of cells enclosing the object;
specifying a distance value for a point outside the object, wherein the distance value for the point outside the object is negative;
associating an outside reconstruction method with the first cell, wherein the outside reconstruction method evaluates, for each point inside the first cell, to the specified distance value for the point outside the object;
determining, for each stylized stroke, centerline cells of the set of cells, each centerline cell enclosing a portion of the centerline of the stylized stroke;
associating, with each centerline cell, a centerline reconstruction method, wherein the centerline reconstruction method evaluates a distance for each point within the centerline cell, the evaluation for a particular point within the centerline cell further comprising the steps of:
locating a closest point on the centerline that is nearest to the particular point;
determining an offset distance from the closest point to the particular point;
determining, for each profile in the set of profiles corresponding to the stylized stroke, a profile distance at the closest point; and
subtracting the offset distance from a function of the profile distances to evaluate the distance for the particular point within the centerline cell;
generating, for each terminal of each stylized stroke, a terminal distance field, the terminal distance field including a terminal reconstruction method;
determining, for each point in the first cell, a reconstructed distance of the first cell using the outside reconstruction method, reconstructed distances of the centerline cells using the centerline reconstruction methods, and reconstructed distances of the terminal distance fields using the terminal reconstruction methods; and
combining, for each point in the first cell, the reconstructed distance of the first cell, the reconstructed distances of the centerline cells, and the reconstructed distances of the terminal distance fields to generate the distance field of the object, wherein the steps are performed in a processor.

2. The method of claim 1, wherein the function determines a side of the centerline on which the particular point lies, and wherein the function selects a particular profile distance corresponding to a particular profile associated with the side of the centerline.

3. The method of claim 1, wherein the combining further comprises:
selecting a maximum distance of the reconstructed distances.

4. The method of claim 1 further comprising:
rendering the distance field.

\* \* \* \* \*